(12) United States Patent
Saad et al.

(10) Patent No.: US 11,106,803 B2
(45) Date of Patent: Aug. 31, 2021

(54) NLP-ASSISTED AUTOMATIC ASSIGNMENT OF DATA PROTECTION POLICIES BASED ON USER INTENTIONS

(71) Applicant: EMC IP Holding Company LLC, Hopkinton, MA (US)

(72) Inventors: Yossef Saad, Ganei Tikva (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 146 days.

(21) Appl. No.: 16/171,198

(22) Filed: Oct. 25, 2018

(65) Prior Publication Data
US 2020/0134197 A1  Apr. 30, 2020

(51) Int. Cl.
| | |
|---|---|
| *G06F 21/60* | (2013.01) |
| *G10L 15/26* | (2006.01) |
| *G06K 9/00* | (2006.01) |
| *G06F 40/247* | (2020.01) |

(52) U.S. Cl.
CPC ............ *G06F 21/60* (2013.01); *G06F 40/247* (2020.01); *G06K 9/00422* (2013.01); *G10L 15/26* (2013.01)

(58) Field of Classification Search
CPC ........ G06F 21/60; G06F 40/247; G06F 17/27; G06K 9/00422; G06K 9/00; G10L 15/265; G10L 15/00
See application file for complete search history.

(56) References Cited

U.S. PATENT DOCUMENTS

2016/0219048 A1 * 7/2016 Porras .................. H04L 41/147
2020/0273449 A1 * 8/2020 Kumar ................. G06F 16/353

* cited by examiner

*Primary Examiner* — Quazi Farooqui
(74) *Attorney, Agent, or Firm* — Workman Nydegger

(57) ABSTRACT

One example method includes receiving user input concerning a data protection policy for an entity, where the user input is in the form of written input and/or audio input, when the user input comprises audio input, translating the audio input into text, determining an intention of the user with respect to data protection for the entity by translating the text to common terms by interpreting terms of the text that have the same meaning as being similar words and applying context to the words, identifying a data protection policy that best corresponds to the intention of the user concerning data protection for the entity, and applying the data protection policy to the entity.

19 Claims, 3 Drawing Sheets

NLP-ASSISTED AUTOMATIC ASSIGNMENT OF DATA PROTECTION POLICIES BASED ON USER INTENTIONS

FIELD OF THE INVENTION

Embodiments of the present invention generally relate to data protection and availability. More particularly, at least some embodiments of the invention relate to systems, hardware, software, computer-readable media, and methods for automatically generating and assigning data protection policies to one or more entities based on user intentions.

BACKGROUND

Enterprises generate significant amounts of important data that is typically preserved in some type of data protection environment. Typical data protection environments employ a variety of hardware and software in order to provide data security, access, and availability. There is often a wide variety of different types of entities that require protection, and the particular data protection needs may vary from one entity to another.

Thus, one of the main challenges in a data protection (DP) environment is to assign the right policies to the protected entities. For example, when an administrator or other user needs to protect a storage volume (LUN) or a virtual machine (VM), the administrator must decide which protection policy to associate with the protected entity and, from that, derive the schedule, frequency and type of protection.

While the creation and assignment of data protection policies can be done manually for each protected entity in some limited circumstances, this process becomes significantly more complex when thousands, or more, entities are involved. In circumstances like this, it is simply not possible, or practical, for a single person to generate and assign data protection policies to thousands of different entities in a complex, and changing, data protection environment. While responsibility for setting a data protection policy might be delegated to the person who created the protected entity, those persons typically lack the knowledge concerning matters such as organizational polices and regulatory requirements for example, that may be needed to develop complete and coherent data protection policies.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
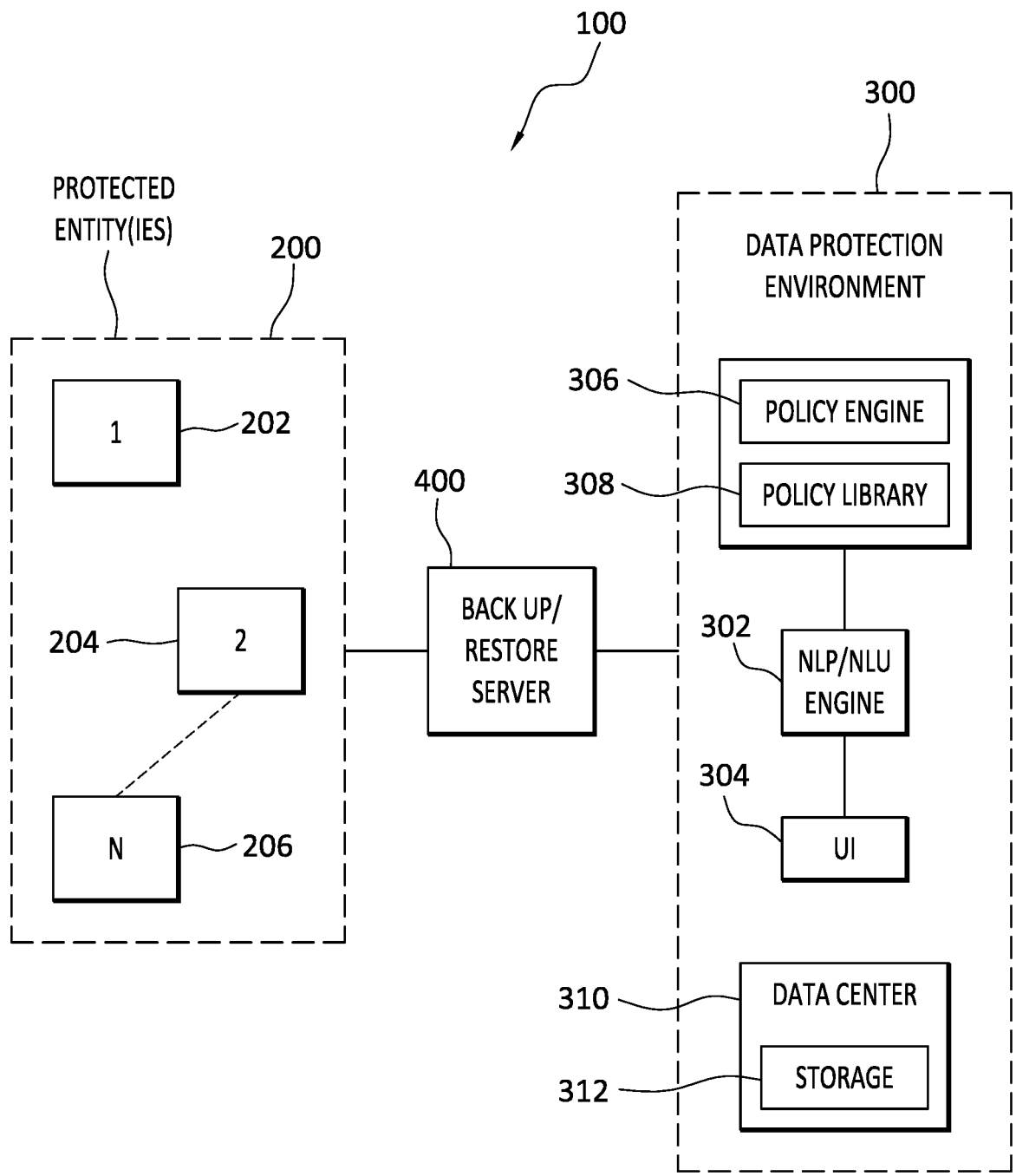
FIG. 1 discloses aspects of an example operating environment for some embodiments of the invention.

Embodiments of the present invention generally relate to data protection and availability. More particularly, at least some embodiments of the invention relate to systems, hardware, software, computer-readable media, and methods for automatically generating and assigning data protection policies to one or more entities based on user intentions.

In general, data protection (DP) policies define how a protected entity is to be protected. Thus, a data protection policy may include the type of protection that should be used, such as real-time replication, backup, or archiving, the granularity, for example, a stand-alone virtual machine (VM), a multi-VM application, the timing of the protection, such as a backup schedule, and retention policy for copies, and various other parameters including, but not limited to, an allowed location of copies, and storage type.

As well, the data protection policy that should be applied for each protected entity is dependent on various parameters including the level of importance/criticality of the data, the level of sensitivity of the data, regulatory requirements, organizational policies and business practices. For example, a financial institution might classify its financial transactions database as 'critical,' and thus would require a low RPO (Recovery Point Objective) so that in case of a failure, minimal data would be lost. This financial institution might additionally require a retention policy concerning transactions, in accordance with regulatory requirements such as those promulgated by the FDIC, for example. On the other hand, the same institution may choose a different classification for their e-mail system, and specify a much different retention policy, for example, to avoid exposure in case of judicial e-discovery.

In many organizations, there is one person, or team, that is, an administrator, that is assigned to define the available DP policies. However once such policies are defined, they must then be assigned to protected entities, in what may be a long and tedious process in a large organizations that can include tens of thousands of such entities. Moreover, the administrator does not necessarily know the intended use of each protected entity, and therefore does not know which policy is relevant for that entity. The result is a manual process of forms filled by the users and sent to administrators for implementation. This process is cumbersome and not scalable.

Thus, a functionality gap is apparent. Particularly, in order to resolve scalability issues, the data protection policy assignment cannot be performed in a central way by the administrators. On the other hand, however, the users do not know how to select the right policies to assign to a protected entity. As disclosed herein, embodiments of the invention may be effective in closing this functionality gap.

More specifically, embodiments of the invention analyze natural language inputs, whether in text or audible form, from a user, and deduce from that, the intentions of the user with respect to the protection of an entity. When such intentions are ascertained and are taken into account, along with external parameters such as the industry they are in, and the regulatory requirements of that industry, a more accurate estimation of the required policy can be deduced and then automatically be applied to the protected entity.

In some example embodiments, a user can specify his intentions concerning data protection for a particular entity in his own words, whether by typing a text in a certain field, such as a tag, or by speaking to a device or to a digital personal assistant, such as Amazon Alexa or Apple Siri, for example, or any other voice and/or text recognition software and/or hardware. Then, natural language processing (NLP) may be applied to understand the intentions of the user, correlate those intentions with existing policies, and choose the best policy available for data protection of the entity.

Advantageously then, embodiments of the invention may provide various benefits and improvements relative to conventional hardware, systems and methods. To illustrate, embodiments of the invention may improve the operation of a computing system, or element of a computing system, by improving and simplifying both the definition and implementation of data protection policies for large and diverse populations of entities. Moreover, embodiments of the invention may be effective in implementing data protection policies more quickly than conventional approaches, and such embodiments may also be more comprehensive than conventional approaches insofar as the types and numbers of variables relating to data protection are concerned. As well, embodiments of the invention may be effective in providing for consistent definition and implementation of data protection policies across an enterprise and/or other population of protected entities.

A. Aspects of an Example Operating Environment

The following is a discussion of aspects of example operating environments for various embodiments of the invention. This discussion is not intended to limit the scope of the invention, or the applicability of the embodiments, in any way.

Where data protection operations, such as backup and/or restore operations are performed, at least some embodiments may be employed in connection with a data protection environment, such as the Dell-EMC DataDomain environment, which can implement backup, archive, restore, and/or disaster recovery, functions. However, the scope of the invention is not limited to this example data protection environment and extends, more generally, to any data protection environment in connection with which data is created, saved, backed up and/or restored. More generally still, the scope of the invention embraces any operating environment in which the disclosed concepts may be useful. For example, embodiments of the invention may be employed in connection with data backup and restore platforms such as the Dell-EMC NetWorker and Avamar platforms.

The data protection environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, an operating environment 100 may include a plurality of entities 200, such as the entities 202, 204 and 206. The entities can be any of the entities disclosed herein and, more generally, can be any entity that is protected, or desired to be, in connection with one or more data protection policies. An operating environment may include as few as one entity 200, or tens, hundreds, or thousands of entities, or more. More generally, an operating environment 100 can include any number 'n' of entities where 'n' is equal to, or greater than, 1.

The entities 200 may take any form, including, but not limited to, a VM, storage volume or LUN, container, database or any other entity desired to be protected. In general, a VM is a virtualization of underlying hardware and/or software and, as such, one or more of the clients 200 may include or otherwise be associated with various underlying components. The scope of the invention is not limited for use with any particular type, number, or grouping, of entities.

As further indicated in FIG. 1, embodiments of the invention may operate in connection with a data protection environment 300, or other environment, that includes a Natural Language Processing (NLP)/Natural Language Understanding (NLU) engine 302 configured to communicate with a User Interface (UI) device 304 operable by a user to provide input to the NLP/NLU engine 302 concerning the development and assignment of data protection policies for one or more of the entities 200. The NLP/NLU engine 302 may also communicate with a policy engine 306 and policy library 308. Among other things, the policy engine 308 may use input from the NLP/NLU engine 302 to generate new and/or amended data protection policies, which may be retrievably stored in the policy library 308 for later use, modification, copying, or deletion. The policy engine 308 may cooperate with a backup/restore server 400, and/or other entity, to implement one or more of the data protection policies with respect to one or more of the entities 200.

The data protection environment 300 may also comprise, or consist of, a datacenter 310 with associated storage 312. Backups of the entities 200, which may be created in whole or in part by an entity such as the backup/restore server 400, may be stored in the datacenter 310, although that is not necessarily required.

It should be noted that the arrangement and functional allocation disclosed in FIG. 1 is presented only by way of example, and is not intended to limit the scope of the invention in any way. By way of illustration, the NLP/NLU 302, UI 304, policy engine 306 and policy library 308 may collectively comprise an entity that is not part of the data protection environment 300, but which operates in connection with the data protection environment 300. As one further illustration, a datacenter 310 may alternatively include all of the NLP/NLU 302, UI 304, policy engine 306 and policy library 308.

With continued reference to the data protection environment 300, in some embodiments, the data protection environment 300 may be implemented as, or comprise, a Dell-EMC DataDomain data protection environment, although that is not required. As well, the data protection environment 300 may additionally include backup applications and associated hardware and software, such as backup servers for example. Such backup applications may include, for example, EMC Corp. Avamar and EMC Corp. NetWorker.

The data protection environment 300 may support various data protection processes, including data replication, cloning, data backup, and data restoration, for example. As noted, the data protection environment 300, may comprise or consist of datacenter 310, which may be a cloud storage datacenter in some embodiments. The datacenter 310 may include and/or have access to storage 312, such as a data storage array for example. In general, the storage 312 may be configured to store entity 200 backups that can be restored in the event that a loss of data or other problem occurs with respect to the entities 200. The term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

The storage 312 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 312 can use Hard Disk Drive (HDD) storage for throughput intensive workloads that are typically measured in terms of data transfer rates such as MB/s.

B. Example Host and Server Configurations

Figure 2:
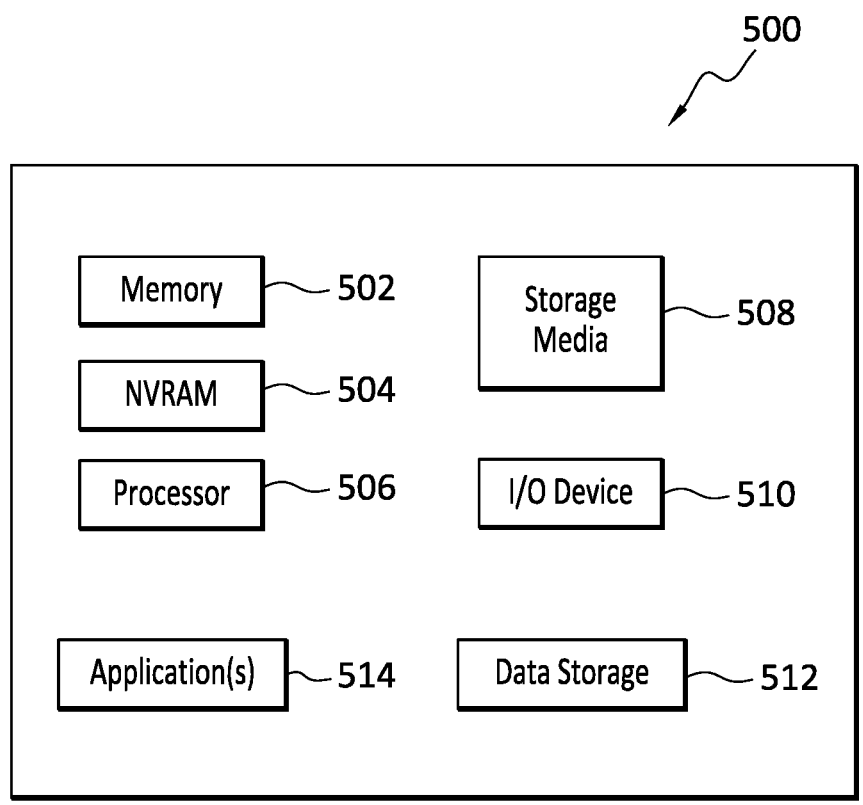
FIG. 2 discloses aspects of an example host configuration.

With reference briefly now to FIG. 2, any one or more of the entities 200, NLP/NLU engine 302, UI device 304, policy engine 306, policy library 308, datacenter 310, and storage 312, can take the form of, or include, or be implemented on, or hosted by, a physical computing device, one example of which is denoted at 500. By way of example, the NLP/NLU engine 302 functionality may be implemented in a server. As well, where any of the aforementioned elements comprise or consist of a virtual machine (VM), that VM may constitute a virtualization of any combination of the physical components disclosed in FIG. 2.

In the example of FIG. 2, the physical computing device 500 includes a memory 502 which can include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 can take the form of solid state device (SSD) storage. As well, one or more applications 514 are provided that comprise executable instructions. Such executable instructions can take various forms including, for example, instructions executable to perform any method or portion thereof disclosed herein, and/or executable by/at any of a storage site, whether on-premised at an enterprise, or a cloud storage site, client, datacenter, or backup server to perform functions disclosed herein in connection with embodiments of the NLP/NLU engine 302, and policy engine 306. As well, such instructions may be executable to perform any of the other operations disclosed herein including, but not limited to, read, write, backup, and restore, operations and/or any other data protection operation.

C. Example Data Protection Policy Operations

As noted herein, example embodiments of the invention enable a user to specify his intentions concerning data protection for a particular entity in his own words, whether by typing a text in a certain field, such as a tag, or by speaking to a device or to a digital personal assistant, such as Amazon Alexa or Apple Siri, for example, or any other voice and/or text recognition software and/or hardware.

Then, natural language processing (NLP) may be applied to understand the intentions of the user, and correlate those intentions with existing data protection policies and/or related information, such as regulatory or legal considerations. Various mechanisms may be used to correlate the intentions with one or more different data protection policies. Such correlation mechanisms may be relatively simple in form and operations, such as a table that can be used to look up one or more data protection policies that map to the expressed intentions of the user. Other example correlation mechanisms, such as artificial intelligence (AI), may be relatively complex and may perform, for example, iterative processes or other processes that refine the correlation of user intentions to data protection policies. This may be accomplished, for example, through the use of multiple questions, decision trees, and/or other mechanisms.

In any case, after the intentions of the user have been correlated to one or more data protection policies, the best data protection policy available may then be automatically selected, automatically assigned to one or more protected entities, and automatically implemented. What constitutes a best data protection policy may be determined on various bases. For example, a best data protection policy may be the data protection policy that most closely corresponds to the intentions expressed by the user.

In this way, an administrator or other user does not have to manually select, assign, or implement, data protection policies. Rather, once the user has indicated his intentions as to the nature of the protection to be afforded to a particular entity, or group of entities, no further involvement by the user is necessary in order to implement and execute a data protection plan for the entity or group of entities. Moreover, the policy can be automatically applied to any and all entities that meet the criteria input by the user.

Embodiments of the invention also provide for automatic definition of a new data protection policy. With regard to definition of a new data protection policy, the user may express his intentions as to the nature of the data protection sought to be implemented with respect to an entity or group of entities. This expression of intention may then be used, such as by a policy engine operating in cooperation with an NLP/NLU engine, to create a new data protection policy which can then be stored, for example, in a policy library.

Figure 3:
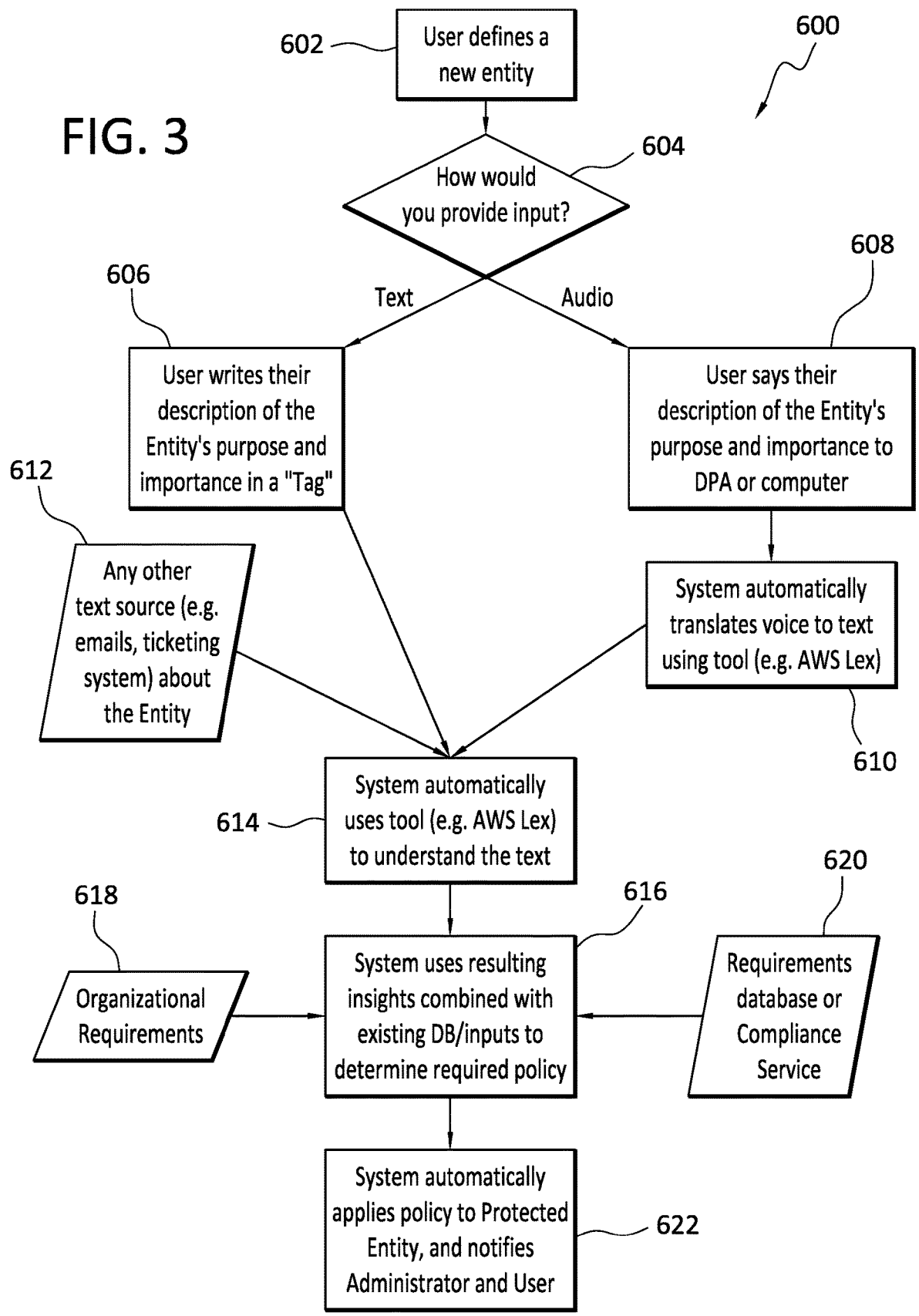
FIG. 3 is a flow diagram that discloses aspects of some example methods for automatic data protection policy assignment.

In some embodiments, one, some, or all, of processes 610 through 622 in FIG. 3 may be performed automatically without requiring further user input or action beyond what is provided in the processes 602 through 608.

With attention now to FIG. 3, details are provided for some example methods for creating and/or assigning data protection policies to one or more entities, where one example embodiment of such a method is denoted generally at 600. The method may be performed in whole or in part by a single entity, or cooperatively by two or more entities, such as an NLP/NLU engine, policy engine, policy library, and UI device, for example. However, the scope of the invention is not limited to performance of the method at any particular site, or by any particular entity(ies).

The various processes of the method 600 may be performed in the order indicated in FIG. 3, although that is not necessarily required. In other embodiments, the order of performance of one or more of the processes of method 600 may be changed. Moreover, not all of the processes of the method 600 are necessarily required to be performed. For example, in some embodiments, processes 608 and 610 may be omitted while, in other embodiments, process 606 may be omitted.

Where a user provides, and/or an entity receives, any input as part of the method 600, such input may be provided by any user interface device or combination of user interfaces and user input devices, examples of which include, but are not limited to, combinations of any one or more of the following: keyboard, microphone, personal assistant, touch screen, webpage, command line interface (CLI), mouse, graphical user interface (GUI) or stylus. User input devices and user interfaces need not have any particular location or configuration.

The method 600 may begin with the definition 602 of a new entity that is to be protected by one or more data protection policies. The definition of the new entity 602 may involve a variety of processes. For example, the definition of an entity 602 may comprise defining an entity type such as a volume, or VM, for example. As part of the definition of the entity 602, or separately, the defined entity may be provisioned, in the expected operating environment of the entity, with hardware and/or software relating to the intended function(s) of the entity.

At 604, the user may have the option to select the manner in which user input will be provided concerning generation of the data protection policy. In the example of FIG. 3, the user may have the option to choose, for example, between text input, provided such as by way of a keyboard for example, or audio input, provided such as by way of a microphone or personal assistant for example. In some instances, the manner of input 604 may be set by default, such as by an administrator or other use, and preconfigured in the system. The scope of the invention is not limited to text and audio input options however and, in other embodiments, a combination of text and audio input, and/or other types of input, may be employed in the generation of a data protection policy.

If, at 604, the user selects the 'text' option for providing input concerning the new data protection policy, the method 600 may advance to 606 where the user may add a description of the entity in a field of a user interface, such as an appropriate tag field available in a management system. The entry might take the form, for example, of something like: "This is a VM for running Oracle database for the billing system," or "This is a LUN to store temporary data used by the analytics engine." As these examples illustrate, the input at 606 may comprise an identification of the entity type, such as VM or LUN for example, and the expected function(s) or use(s) of the entity, such as running a database or storing data for example. The input at 606 may comprise additional, or alternative, information as well, such as the relative importance of the entity with respect to other protected entities in the operating environment.

At 604, the user may alternatively, or additionally, specify that input for generation of the data protection policy will be provided in an audible format 608. Audible input can be provided way of any user interface and/or input device, such as a microphone, or digital personal assistant such as Amazon Alexa or Apple Siri, for example, that can receive and transmit the audible input. The input provided at 608 may, in some embodiments, be simply a spoken version of input that was provided at 606. The audible input can be provided by a human, or by a non-human entity such as a robot for example. The audible input may then be captured by the user interface and/or input device and transmitted, such as in an electronic memo or other form, to a system or device for further processing. If the audible input is garbled or unintelligible, due to background noise for example, an error message may be returned indicating that the input could not be understood and should be repeated.

In some embodiments, human or non-human input will not be accepted by the system for generation of a data protection policy unless the audible input satisfactorily matches a preexisting voiceprint, and/or other biometric, of an authorized user. An unauthorized attempt to generate or apply a data protection policy may trigger the generation of an error message or warning. In this way, unauthorized users can be prevented from generating and applying data protection policies.

The method 600 may then advance to 610 where the audio input is translated into text, providing as output the text translation. In some embodiments, the translation 610 may be performed by a platform such as Amazon Web Services (AWS) Lex for example. AWS Lex, employed in Amazon Alexa devices, is one example of a bot framework that can be used for such translations. Any other bot framework or system that employs Artificial Intelligence (AI) deep learning could alternatively be employed. Example bots employed in various embodiments of the invention may take the form of a chatbot UI component that enables a user to provide voice and/or other input, such as text for example, by way of a web interface such as a web browser.

The text memo, whether obtained through text or voice input, or possibly a combination of the two, as well as any other text input 612 that discusses the protected entity, such as records of the ticketing system or e-mails, when permitted, are further processed 614 by an NLP/NLU engine, such as the AWS Lex example noted herein. In general, such an engine translates the input text to common or standard terms, making words that are similar in meaning the same, and also applies context to the words. To illustrate with some non-limiting examples: (1) "essential" and "critical" may be interpreted by the engine 614 as similar words for the purpose of assigning policies; (2) "I don't think I need this entity to be protected" may be understood by the engine 614 as "no protection needed for the specified entity."

After the user input has been understood and analyzed, it can be cross referenced 616 with, for example, existing company policies 618, a repository of regulatory and industry best-practices database 620, and/or with any other input and information that may bear on how the particular entity under consideration should be protected. The information 620 may be provided as-a-service in some embodiments. This may be done, for example, by way of a simple table with multiple inputs, by a weighted average scoring process, or by any other mechanism suitable for this purpose.

As part of the cross-referencing 616, the policy that most closely corresponds to the intent of the user, as expressed through the user input, may be selected for implementation. In at least some embodiments, this selection may be performed automatically without having been requested or initiated by a user.

Once the policy is determined, the system automatically assigns the policy to the protected entity, and informs the user and the administrator of such action. In some embodiments, the user may optionally review and change the policy of their choice. As well, the user may also unassign, or delete, the selected policy. As with other portions of the method 600, these processes may be performed in connection with text or audio input provided by the user.

In sum then, embodiments of the invention provide for automatic deduction of the intentions of a user concerning one or more protected entities, and can be determined by smart use of NLP and NLU. Based on this, data protection policies can be automatically assigned to those entities 622, thus making the data protection process relatively more efficient and automated, at least with respect to manual processes for example.

It is noted that various modifications can be made to the disclosed embodiments to define still further embodiments. For example, in some embodiments, a data protection policy may be retrieved, modified, and/or deleted, using voice and/or text input. In some embodiments, a policy may be applied to only a single specific entity, or a small number of entities, when such single entity entities are specifically identified by a user. As well, in some embodiments, a data protection policy may be defined so as to automatically expire after a set period of time.

Further, the disclosed functionality may be integrated into, and executed within, a management system. In one particular implementation, the functionality reflected by method 600 may be incorporated in a vCenter server of a VMware environment. As another example, the disclosed functionality may be deployed in a cloud datacenter environment, such as Amazon AWS or Microsoft Azure for example. In the example case of Amazon AWS, a user who wants a new instance of a VM, for example, can simply define and/or assign a data protection policy for the VM using a process such as the method 600.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving user input concerning protection for data generated and/or stored by an entity, wherein the user input is in the form of written input and/or audio input;
   when the user input comprises audio input, translating the audio input into text;
   determining an intention of the user with respect to a particular nature of data protection to be used to protect the data generated and/or stored by the entity by:
   translating the text to common or standard terms; and
   applying textual context to the common or standard terms;
   identifying external parameters, wherein the external parameters comprise an industry type, and regulatory requirements of the industry;
   identifying, using the textual context, the common or standard terms, and the external parameters, a data protection policy that best corresponds to both the intention of the user concerning protection for the data, and the external parameters; and
   applying the data protection policy to the entity; and
   executing the data protection policy so that the data generated and/or stored by the entity is protected as provided by the data protection policy.

2. The method as recited in claim 1, wherein application of the data protection policy to the entity is performed automatically.

3. The method as recited in claim 1, wherein when the user input comprises written input, the method further comprises translating the written input into text.

4. The method as recited in claim 1, wherein identifying the data protection policy comprises correlating the intention of the user, as captured in the user input, with one or more of a company policy, a repository of regulatory policies, or a repository of industry best practices.

5. The method as recited in claim 1, wherein determination of the intention of the user with respect to data protection for the entity is performed automatically.

6. The method as recited in claim 1, wherein determination of the intention of the user with respect to data protection for the entity is performed by one or more of natural language processing, natural language understanding, or artificial intelligence.

7. The method as recited in claim 1, further comprising receiving input concerning a definition of the entity.

8. The method as recited in claim 1, wherein the user input comprises (i) input concerning the purpose of the entity and/or (ii) input concerning the relative importance of the entity.

9. The method as recited in claim 1, wherein the data protection policy is automatically assigned to the entity.

10. The method as recited in claim 1, further comprising modifying or deleting a data protection policy, based on additional user input.

11. A non-transitory storage medium having stored therein instructions which are executable by one or more hardware processors to perform operations comprising:
    receiving user input concerning protection for data generated and/or stored by an entity, wherein the user input is in the form of written input and/or audio input;
    when the user input comprises audio input, translating the audio input into text;
    determining an intention of the user with respect to a particular nature of data protection to be used to protect the data generated and/or stored by the entity by:
    translating the text to common or standard terms; and
    applying textual context to the common or standard terms;
    identifying external parameters, wherein the external parameters comprise an industry type, and regulatory requirements of the industry;
    identifying, using the textual context, the common or standard terms, and the external parameters, a data protection policy that best corresponds to both the intention of the user concerning protection for the data, and the external parameters; and
    applying the data protection policy to the entity; and
    executing the data protection policy so that the data generated and/or stored by the entity is protected as provided by the data protection policy.

12. The non-transitory storage medium as recited in claim 11, wherein application of the data protection policy to the entity is performed automatically.

13. The non-transitory storage medium as recited in claim 11, wherein the method further comprises translating the written input into text.

14. The non-transitory storage medium as recited in claim 11, wherein identifying the data protection policy comprises correlating the intention of the user, as captured in the user input, with one or more of a company policy, a repository of regulatory policies, or a repository of industry best practices.

15. The non-transitory storage medium as recited in claim 11, wherein determination of the intention of the user with respect to data protection for the entity is performed automatically.

16. The non-transitory storage medium as recited in claim 11, wherein determination of the intention of the user with respect to data protection for the entity is performed by one or more of natural language processing, natural language understanding, or artificial intelligence.

17. The non-transitory storage medium as recited in claim 11, wherein the operations further comprise receiving input concerning a definition of the entity.

18. The non-transitory storage medium as recited in claim 11, wherein the user input comprises (i) input concerning the purpose of the entity and/or (ii) input concerning the relative importance of the entity.

19. The non-transitory storage medium as recited in claim 11, wherein the data protection policy is automatically assigned to the entity.

* * * * *